July 5, 1955  L. A. WILSON  2,712,222
REGENERATIVE ROTARY MOTOR
Filed Oct. 18, 1943  7 Sheets-Sheet 4
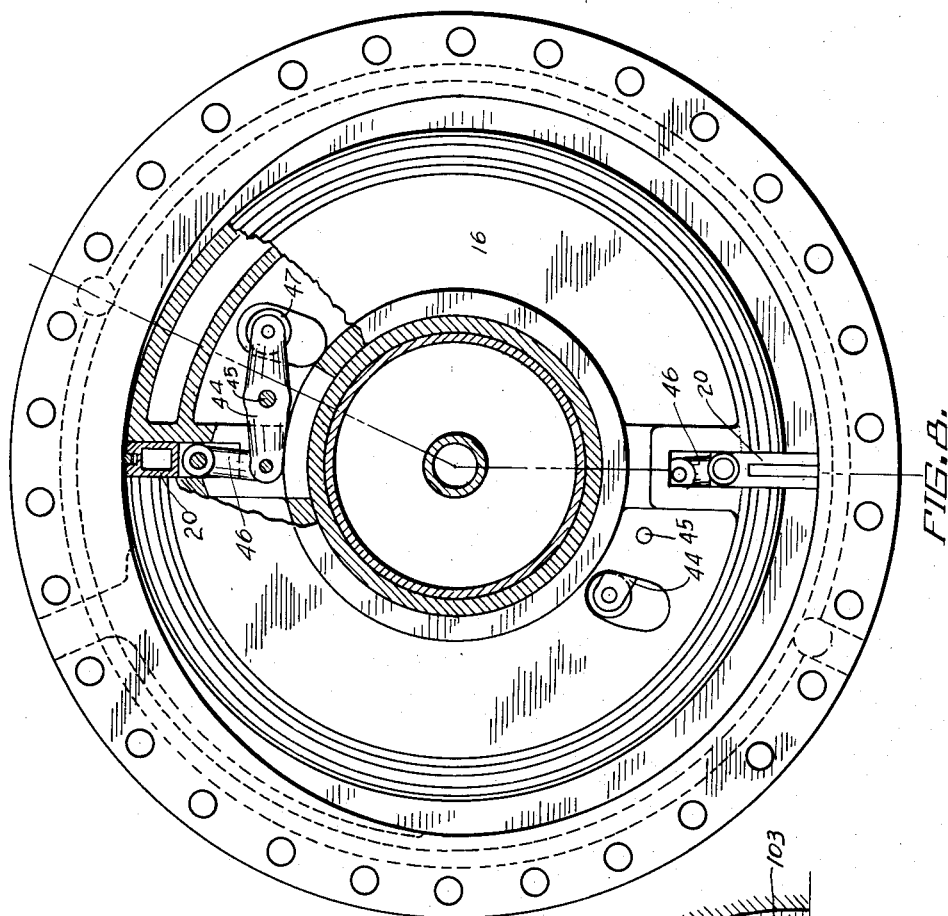
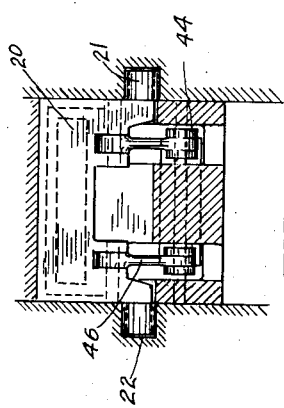
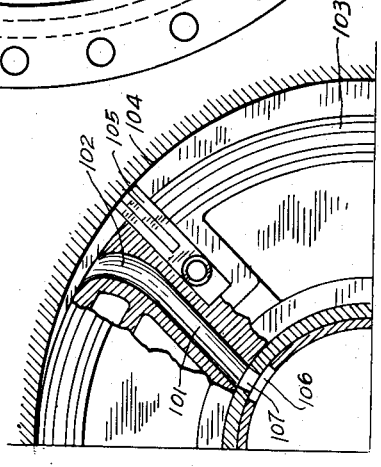
INVENTOR
Leroy A. Wilson
Murray O. Hayes
ATTORNEY

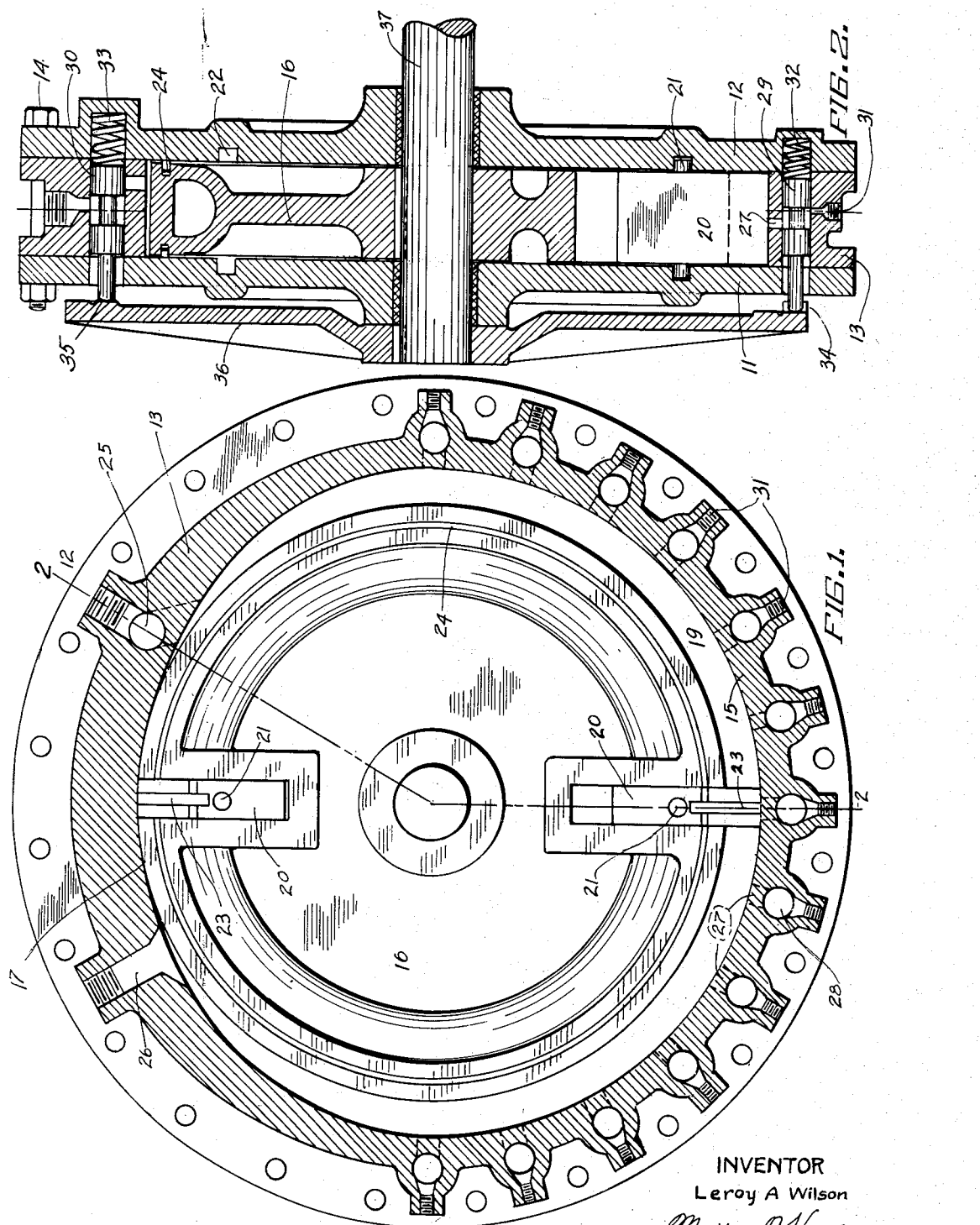

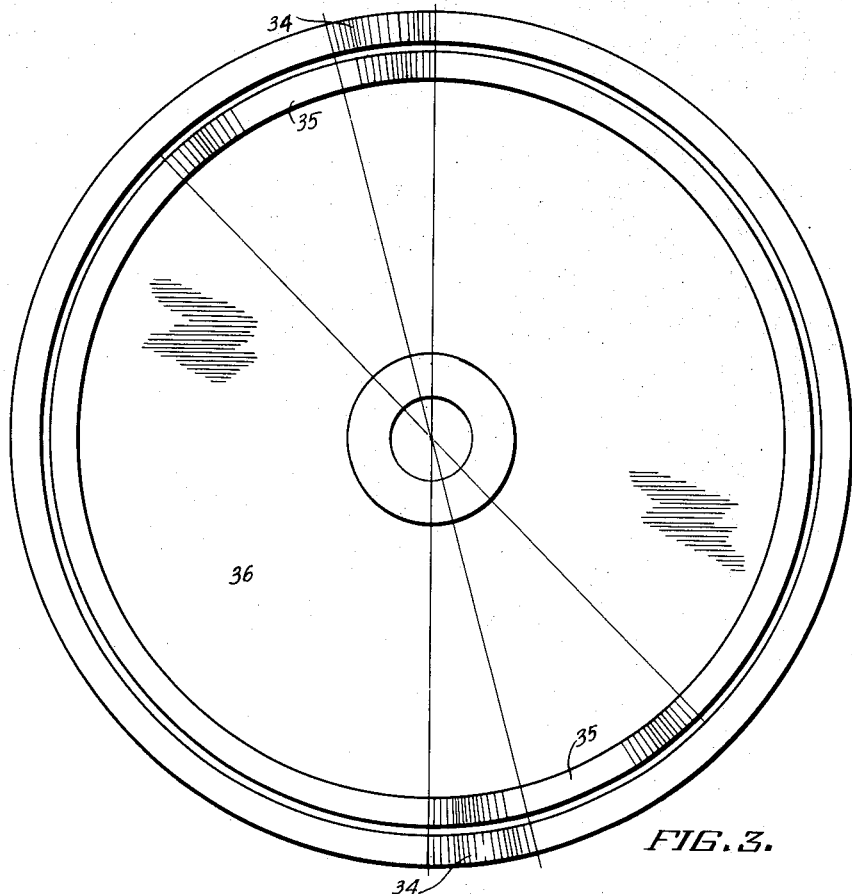
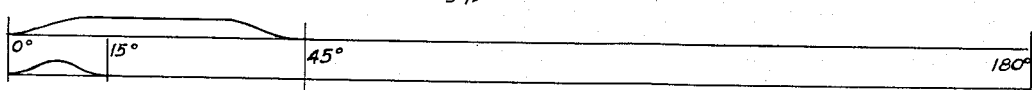
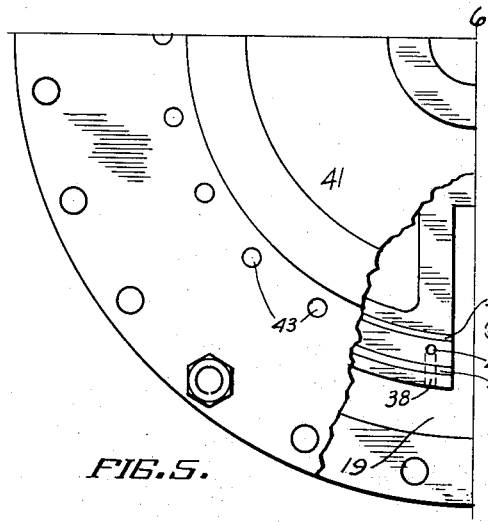
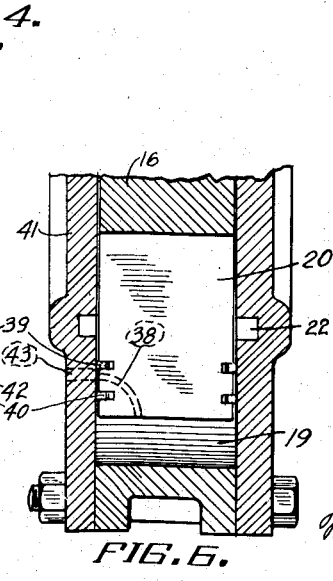

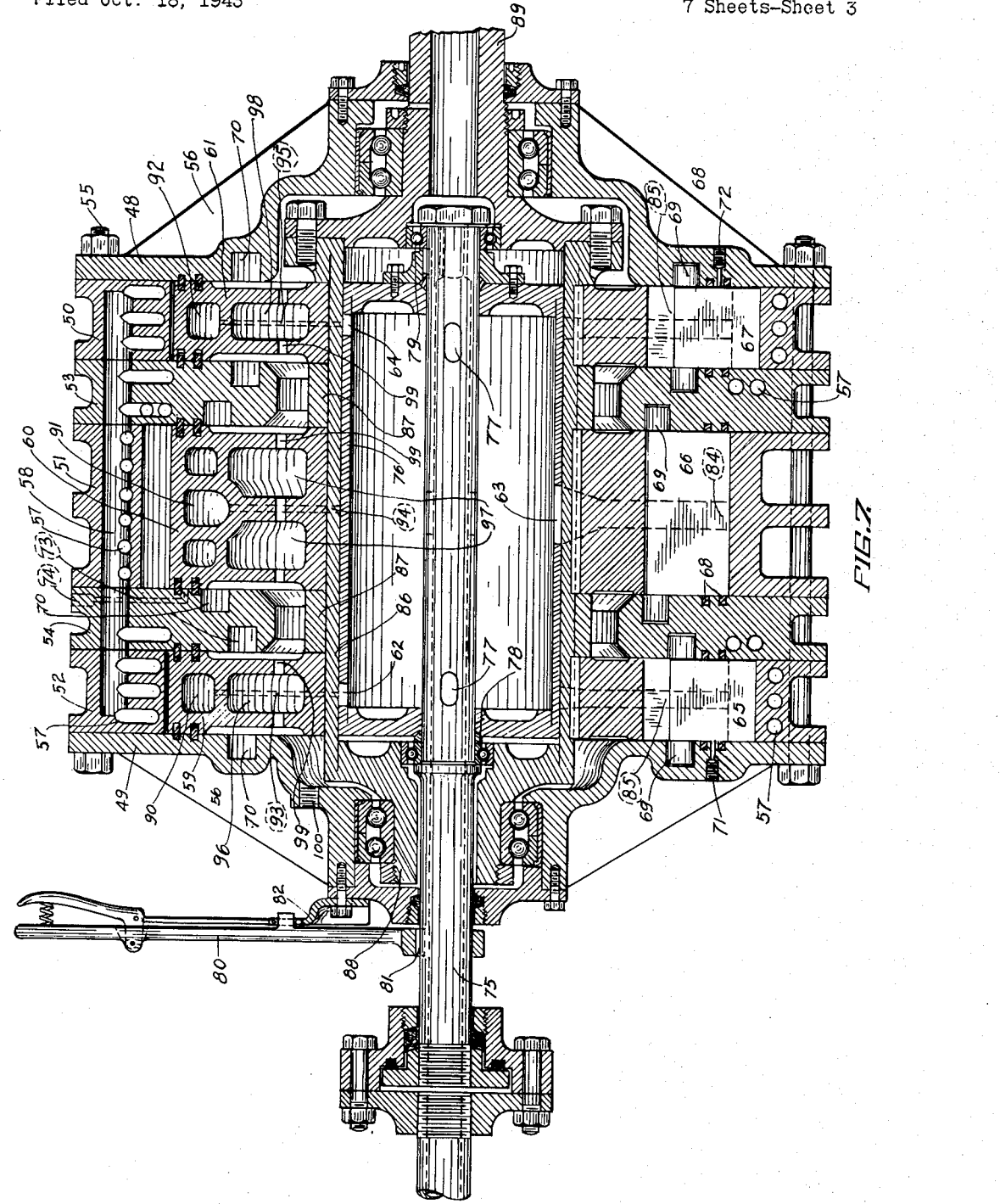

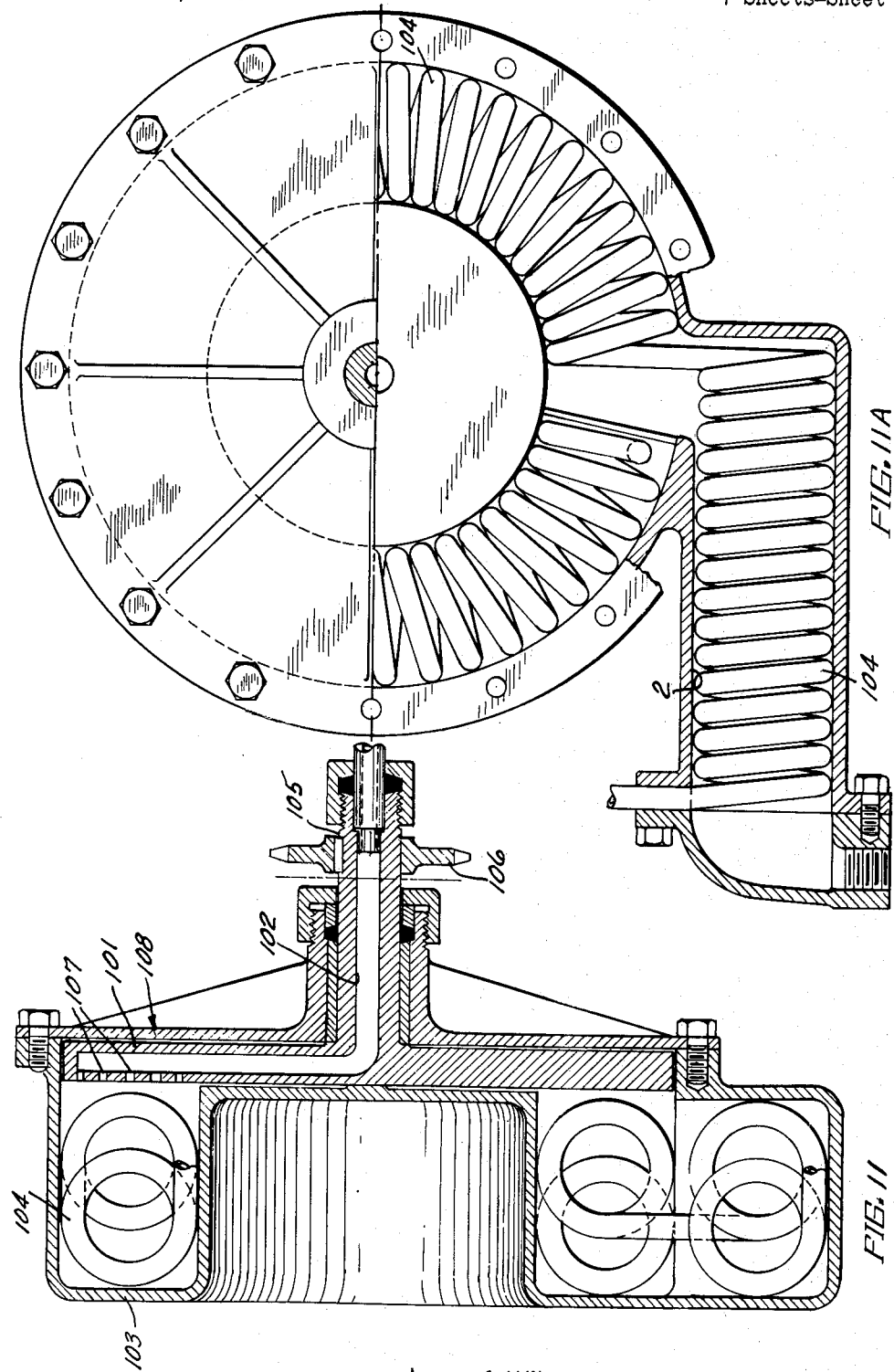

July 5, 1955
L. A. WILSON
2,712,222
REGENERATIVE ROTARY MOTOR
Filed Oct. 18, 1943
7 Sheets-Sheet 6
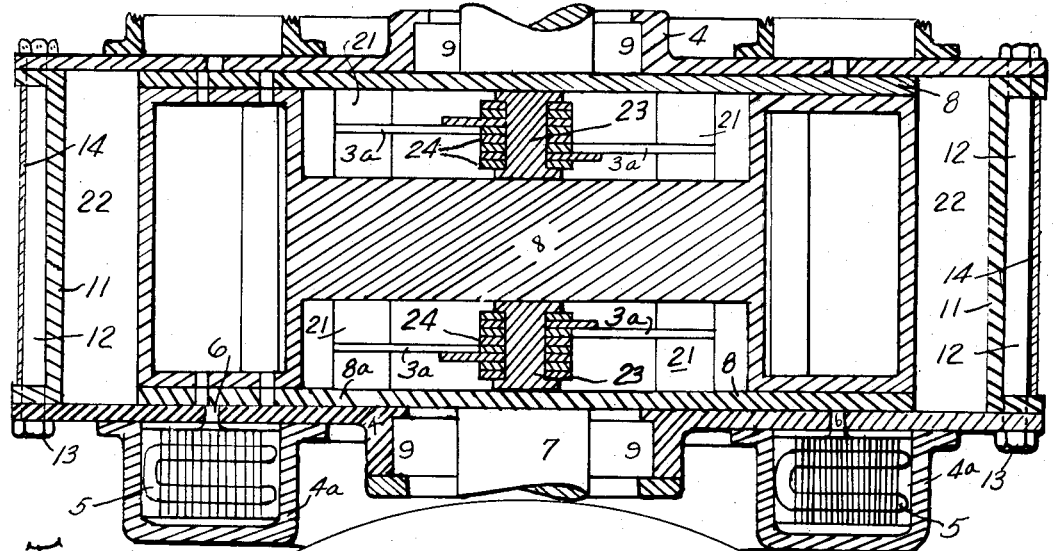
FIG. 12
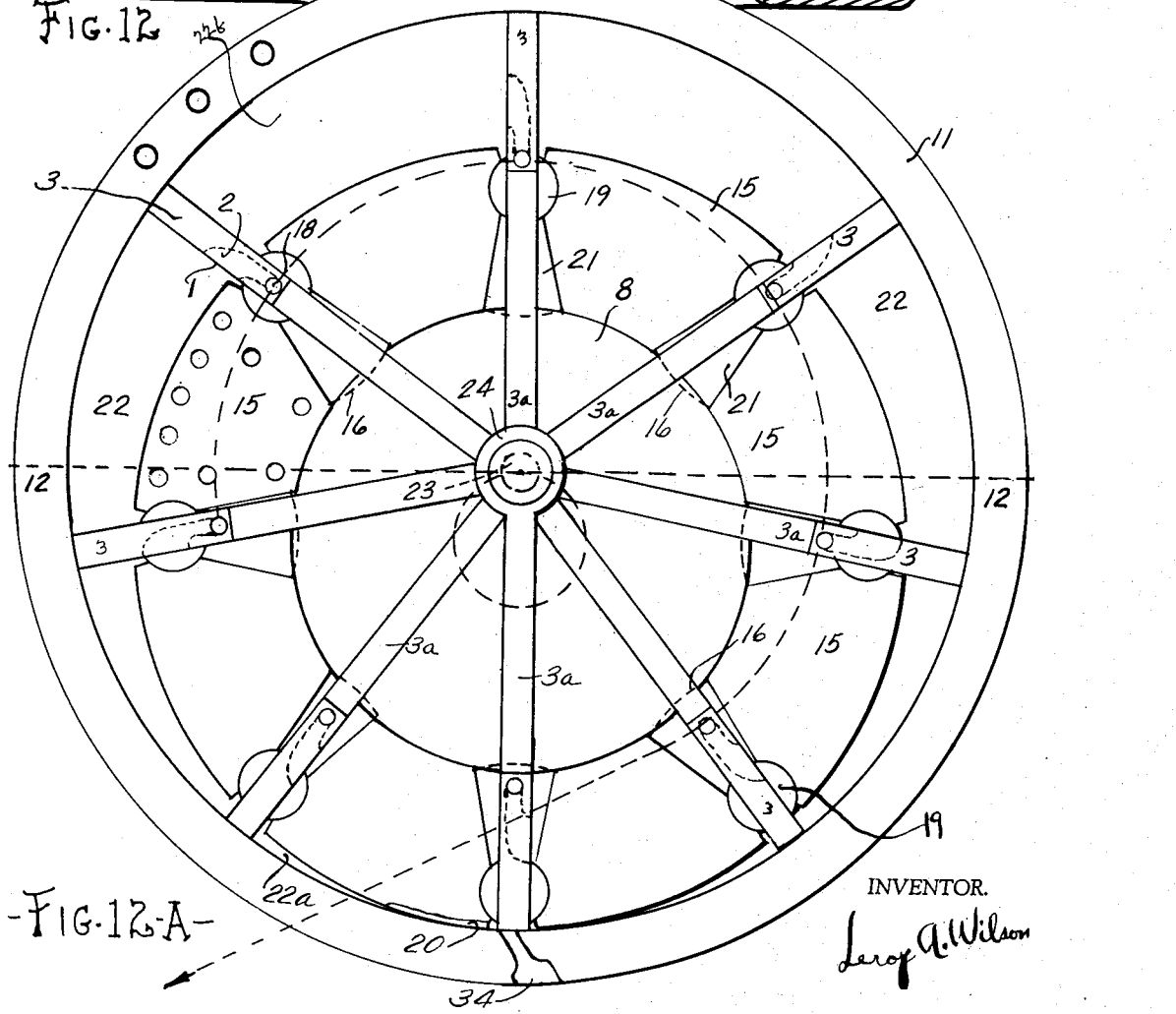
FIG. 12-A
INVENTOR.
Leroy A. Wilson

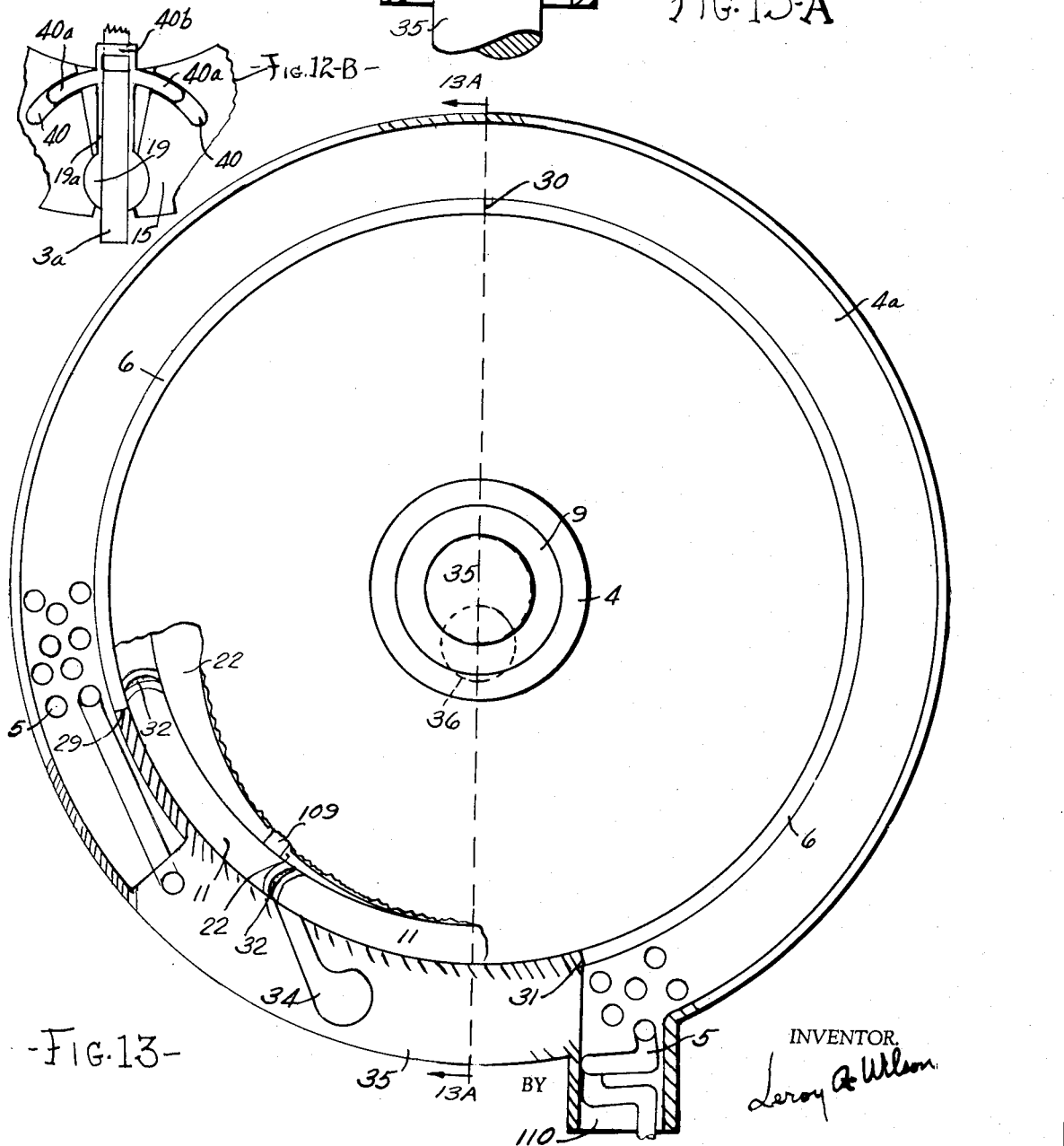

United States Patent Office 2,712,222
Patented July 5, 1955

2,712,222
REGENERATIVE ROTARY MOTOR
Leroy A. Wilson, Veyo, Utah

Application October 18, 1943, Serial No. 506,678

11 Claims. (Cl. 60—66)

This invention relates to a fluid driven rotary motor and has for its objects:

1. To provide a simple and highly efficient fluid propelled motor.
2. To produce a fluid motor having few moving parts.
3. To devise a motor of the type named that shall be of light weight and cheap to manufacture, and easy to disassemble and assemble.
4. To provide a motor wherein the fluid which may leak may be conducted to suitable devices for feed-liquid heating, or other devices wherein heat from said leaked fluid may be utilized.
5. To devise a motor wherein jacketing may be had effectively to prevent cylinder condensation when using certain types of working substances under cycles where cylinder condensation would be objectionable.
6. To devise a heat engine wherein jacketting may be had effectively to prevent unsafe temperatures building up when using certain other types of working substances, particularly those with intake temperatures in excess of the safe thermal upper limit of the metals of which the heat engine is constructed.
7. To devise a motor wherein jacketing may be had so that an isothermal expansion effect may be had.
8. To devise a rotary motor from which fluid may be bled at various stages of expansion for feed liquid heating.
9. To devise a prime mover wherein a large number of steps of regenerative bleeding may easily be effected.
10. To devise a prime mover wherein heat may be transferred from the working substance to the boiler feed liquid, and the cylinder walls thus kept at a safe temperature, especially making it possible to utilize working substances heated to temperatures heretofore impracticable.
11. To provide a simple, efficient balanced cam movement for oscillating the piston vanes in their radial movement, the cam races having easy, gradual, harmonic curvature, and means for counterbalancing the centrifugal force on said piston vanes.

In the drawings:

Figure 1 is a section transverse to the axis through one form of my motor;

Figure 2 is a section taken at approximately right angles to the section in Figure 1, along line 2—2;

Figure 3 is a side view of the cams for operating the intake and bleeder valves;

Figure 4 is a sketch showing the profile of said cams;

Figure 5 is a cut-away view of a modified form of my motor showing a simple form of bleeding arrangement;

Figure 6 is a fragmentary view of said section in Figure 5 taken at right angles to the view in Figure 5;

Figure 7 is a longitudinal sectional view through another form of my motor, which illustrates a form of my novel sleeve valve;

Figure 8 is a view of one end of my motor with the plate removed;

Figure 9 is a view of the broad side of one of the vanes, showing the manner in which the vane lugs fit into the cam races and the method of fastening the counterbalancing device to the vanes;

Figure 10 shows an inlet designed to produce a reaction effect;

Figures 11 and 11-A illustrate a modified form of bleeding device for my motor;

Figure 12 is a section in elevation of my regenerative heating adapted to another type of rotary engine which is capable of very high speed with low friction and extremely high over-all thermal efficiency;

Fig. 12A is a side view in elevation of the engine shown in Fig. 12 with the near side plates removed;

Fig. 12B illustrates an improved form of part 19 of Figs. 12 and 12-A which is designed to better take the thrusts imposed on it by centrifugal and centripetal forces and bending stresses on the vanes 3 and 3a;

Fig. 13 is a section in elevation of an engine constructed similarly to that shown in Fig. 12-A but with the outer ring and rotor which define the outer and inner limits of the expansion chamber respectively both rotating; and Figure 13-A is a section of Fig. 13 taken along line 13A—13A showing the eccentric relation between shafts 35 and 36.

It is a generally accepted fact in modern steam engineering that the most practical way to obtain a reversible cycle is by regenerative bleeding for feed water heating, and that in order to obtain true reversibility, an infinite number of bleeding steps must be had during the expansion of the vapor, and that the greater the number of said steps the higher the efficiency that can be obtained, providing a sufficiently high temperature and pressure is had to keep in harmony with the stages of bleeding. Furthermore, that, according to Carnot's law, a reversible cycle is the most efficient cycle that can be had; and, that, in light of well-established developments in steam and prime-mover engineering in general, there is not likely to be developed a reversible cycle which can compete with the regenerative cycle, thru a given thermal range.

It is for this reason that I set about developing a motor which would fulfill these conditions. It was evident that the reciprocating engine offered little incentive, because in order to secure an infinite number of steps of bleeding here would require either an excessively long cylinder or expensive compounding, altho the same methods of bleeding I have developed for my rotary motor can well be applied to reciprocating engines. The turbine was out of the question because staging here complicates, and greatly increases the first cost, and also maintenance, and in addition I desired to perfect an engine having a greater horsepower per unit weight than is possible with a turbine.

The most practicable solution was to have an annular chamber wherein a vapor could be worked expansively and fractions of said vapor bled at various points in said chamber. In Figs. 1 and 2 is illustrated a rotary motor similar to the one disclosed in my application Serial No. 96,997, filed March 24, 1926, now abandoned.

My purpose in jacketing might be summarized as follows: (1) to be able to use water or other working substances having tendencies to decrease quality with expansion, (2) with working substances having high ratio of specific heat to latent heat, superheating usually accompanies expansion, so jacketing for this purpose logically would be dispensed with, (3) when using working substances of very high temperatures, jacketing may be used to circulate coolant therethrough to prevent melting or warping or creeping of cylinder walls. Coolant might properly be boiler feed liquid, (4) to secure isothermal effect. In the latter event the working substance when in the expansion chambers becomes the coolant and receives heat from the fluid in the jackets.

In the bleeding process, it is desirable to secure the maximum amount of heat from the lower pressure steam which has already done considerable work, so that the power output of the prime-mover may not be seriously diminished; also it is desirable to bleed successively higher temperature steam, to elevate gradually the temperature of the feed liquid toward its maximum thermal capacity.

In the modification shown in Figs. 1 and 2 the stator comprises three principal elements—side members 11 and 12, and peripheral member 13 therebetween; these parts are held in assembled relation by bolts 14 therethrough. The inner periphery of 13 is formed with a major segment 15 of less curvature than that of the periphery of rotor 16 and a minor segment 17 having a curvature equal to that of the said rotor; these two segments are connected by harmonically curved surfaces. The axis of rotation of rotor 16 is so placed that said rotor is in contact with said minor segment for a considerable angular distance; the major segment 15 is also concentric with said axis and the steam chamber 19 is thus of uniform radial extent over the greater part of its length, which is an important factor in making my motor successful.

Vanes 20 are radially slidable in rotor 16; the said vanes are moved by the co-action of lugs 21 carried thereby, with cam grooves 22 in side members 11 and 12. Packing strips for vanes and rotor are indicated by 23 and 24 respectively. The inlet port is designated by 25 and the exhaust port by 26.

Bleeding is accomplished in as many stages as desired by ducts 27 which lead from chamber 19 to the cylindrical holes 28 in which piston valves 29 move to control said duct. A similar piston valve 30 controls inlet port 25. From holes 28 the bled steam passes to openings 31 which are threaded to receive pipes which carry the said steam to heat the feed water. Valves 29 and 30 may be maintained in the closed position by springs 32 and 33 respectively. The valves 29 and 30 are opened by cams 34 and 35 respectively on cam disk 36 which is keyed to the same shaft 37 as is rotor 16. Cam 35 has an angular extent of 45° from beginning of open to completion of close while cam 34 has an angular extent of 15°. As disk 36 rotates with shaft 37 the bleeder ports are opened successively and steam is withdrawn from chamber 19 at numerous stages of the stroke with resulting high efficiency of operation.

Figs. 5 and 6 show a still simpler method of multiple stage bleeding. A duct 38 leads from the peripheral surface of rotor 16 at a point just to the rear of vane 20 and extends to the lateral surface thereof at 42 between two packing strips 39 and 40. As many bleeder orifices 43 as may be desired are provided through stator side member 41, and as the opening 42 registers with each of orifices 43 a quantity of steam is withdrawn from chamber 19. As stator member 41 and rotor 16 run with a snug fit there is no appreciable loss of steam from any of orifices 43 except the one immediately opposed to opening 42.

Figs. 8 and 9 disclose a method of balancing vanes 20 against centrifugal force, which if not counteracted will throw said vanes radially and cause undue and unnecessary wear of lugs 21 and grooves 22, as well as reducing efficiency through excessive friction. As shown in the said figures, levers 44 are pivoted at 45 to rotor 16. One end of each of said levers is pivoted to a link 46 which also has pivotal connection with vane 20; the other end of lever 44 carries a weight 47 of such magnitude that it exactly balances the centrifugal effect of vane 20 and link 46. For simplicity of showing the bleeding devices were omitted from these figures.

The full advantage of this invention is best realized in the embodiment shown by Fig. 7. In this case I not only utilize the multiple stage bleeding principle, but I employ a plurality of rotor members so disposed that the thrust due to the intake steam on said rotors is counterbalanced and thus uniform wear of bearings is had and there is no binding or distortion of parts due to unequalized pressures. This is accomplished by having equal rotor areas, spaced 180° apart, receive the said steam pressures. I further provide a jacketing which may serve for the circulation of a coolant which will partly heat the boiler feed fluid or with other working substances may serve as a steam jacket to prevent cylinder condensation. It is further constructed to utilize any leakage as bled steam to heat the feed fluid and thus packings absolutely steam tight are not essential. Another advanced feature is the use of a sleeve valve by means of which my motor may be reversed.

The stator is made up essentially of side members 48 and 49, annular members 50, 51, and 52 which constitute the outer peripheral walls of the steam chambers, and spacing cam groove bearing members 53 and 54 which are intercalated between members 50 and 51, and 51 and 52, all of which are maintained in assembled relationship by bolts 55. Webs 56 strengthen side members 48 and 49. Ducts 57 are formed in the stator members for the circulation of either a coolant or for steam jacketing, as set forth above; a common chamber 58 into which the fluid to be circulated may be admitted and which connects all of said ducts 57 is provided.

Three vane carrying rotor elements 59, 60, and 61 are used; the sum of the peripheral areas of the outer two, i. e., of 59 and 61, is equal to that of 60; the intake ports 62 and 64 through which steam is admitted to act upon vanes 65 and 67 are diametrically opposite port 63 through which steam passes to act upon vane 66 in rotor element 60. In this way the thrust due to the pressure of intake steam is equalized and even wear on bearings is assured. Suitable annular packings 68 are provided between stator and rotor parts.

As in the modification shown in Fig. 1 vanes 65, 66, and 67 are reciprocated through the coaction of lugs 69 on said vanes with cam grooves 70 in which said lugs run. Also as in Fig. 1 the steam chambers have segments of different curvature joined by harmonically curved surfaces, to provide chambers of substantially uniform cross sectional area throughout the greater part of their extent.

Bleeding from the chambers in which vanes 65 and 67 work is accomplished through series of orifices designated by 71 and 72, respectively, which pass through stator side members 49 and 48 respectively. The method of bleeding is that disclosed in Figs. 5 and 6. For bleeding from the chamber in which vane 66 operates the same method is used, but the bled steam passes through ducts 73 in stator member 54 to orifices 74.

Intake of steam to the working chambers is controlled by the sleeve valve mechanism now to be described. Steam comes in through pipe 75 and issues thence into the cylindrical inner sleeve member 76 through apertures 77; ports 62, 63 and 64 are formed through the sides of 76. Sleeve member 76 is securely fixed to pipe 75 where said pipe passes through the ends thereof, so that the two members mentioned may be rotated together; pipe 75 is journalled in bearings 78 and 79. To change the point of intake of steam and the cut-off lever 80 is keyed to pipe 75 at 81; a toothed segment 82 is fixed to side member 49 to lock said lever in any desired position.

Steam inlet ducts 83, 84 and 85 are formed through rotor elements 59, 60, and 61 and open at the periphery of said elements just back of the respective vanes; when said ducts are brought into registry with ports 62, 63, and 64 steam is admitted to act upon said vanes. By means of lever 80 the sleeve 76 can be rotated so that steam will be admitted to ducts 83, 84, and 85 while the radially outer ends of said ducts are to a greater or less extent between stator and rotor as described in connection with Fig. 1. It is thus apparent that the cutoff may be varied.

The outer sleeve of my sleeve valve mechanism is the cylindrical member 86 upon which rotor elements 59, 60, and 61 are keyed and maintained in proper relative position by spacers 87. Member 86 has the cylindrical extensions 88 and 89 at the ends thereof which are provided with ducts 90 and ducts 91 by which the rotor assembly is mounted inside the stator. As the rotor rotates the inlet ducts 83, 84, and 85 are brought into registry with ports 62, 63, and 64 at the appropriate time to give an impulse to the respective vanes. Exhaust ports are provided as in the embodiment illustrated in Fig. 1, but are so positioned as not to be shown in Fig. 7. Member 89 may be continued into a shaft from which the power developed by my motor may be taken.

As above mentioned, I may steam jacket the various parts of my device. One arrangement is shown in Fig. 7. The chambers 90, 91, and 92 may have ducts 93, 94 and 95 open into them and disposed to register with ports 62, 63, and 64 whereby steam may be admitted to said chambers; other passages (not shown) are formed for the withdrawal of such steam from the said chambers. Other chambers 96, 97, and 98 may be provided, all connected together by a series of ducts 99. These permit the circulation of leakage steam, which may be withdrawn through orifice 100. In fact, it is contemplated to permit the leakage of a certain quantity of such steam, inasmuch as it will carry lubricant, to supply oil to the various bearings, all of which are accessible to such steam.

The tremendous advantage of my motor herein disclosed over a turbine which employs multiple stage bleeding is apparent to one skilled in this art, inasmuch as my device can be bled at what, for practical purposes, amounts to an infinite number of stages whereas the turbine is limited to a small number of such stages. This device will have a higher ratio of power output to weight of engine than any now in use, as well as a higher efficiency.

Fig. 10 shows intake duct 101 deflected at 102 to utilize the reaction effect of the entering steam. The rotor is designated by 102, the stator by 104, the vane by 105, and the parts in the inner and outer valve sleeves by 106 and 107 respectively.

Figure 11A is a side elevation of said device with part of ribbed casing 108 and disc 101 cut away to expose coils 104. Shaft 105 is driven or rotated by sprocket 106 or other suitable device or it may be attached directly onto the driven shaft of my rotary engine. In this latter event, I may bleed the steam through the shaft of said engine but in general prefer to keep hot steam from heating the bearings. In any event, the steam is bled continuously from some predetermined point to near, or to, the exhaust point from said engine. To give a typical example, let us say we are expanding steam from 1,000 p. s. i. to 15 p. s. i. pressure. A typical bleeding arrangement is to start bleeding steam at about 100 p. s. i., when it has expanded to that degree of expansion in the engine, and to continue the bleeding until approximately 15 p. s. i. or terminal pressure is reached, using a portion of the exhaust steam to heat the feed-water to some temperature near that of the final temperature of the bled steam exhausting from the device shown in Figures 11 and 11A.

The device is driven merely for the purpose of distributing the steam or, rather, causing the hot steam bled first to impinge against the hotter parts of the coil and vice versa. The rotation of shaft 105 and disc 101 causes ports 107 to synchronize in rotation with the rotor of the engine or other rotating part through which the steam is bled, said rotating part, if other than the rotor, synchronizing in rotation with said rotor.

The device is driven merely for the purpose of distributing the steam or, rather, causing the hot steam bled first to impinge against the hotter parts of the coil and vice versa. The rotation of shaft 105 and disc 101 causes ports 107 to synchronize in rotation with the rotor of the engine or other rotating part thru which the steam is bled, said rotating part, if other than the rotor, synchronizing in rotation with said rotor.

A series of such devices may be used or one may be made to cover the entire bleeding range.

Figures 12 and 12-A illustrate a similar device, save that the housing for the feed-water coils forms a part of the motor housing and bled steam passes directly from the bleeding outlet port thru a continuous passage thru the engine casing and impinges upon said feed-water coils. Steam from the expansion chamber of the engine passes thru hole 1 into passage 2 and from said passage at its outlet 18 on the side of the vane 3 thru passage 6 onto coils or coil 5. This passage 6 is a continuous opening thruout the bleeding cycle or step, altho it may have stiffening bars or cast parts athwart it so long as they do not seriously interfere with bleeding. The method is to have steam issue from the expansion chamber continuously during the bleeding step, and said steam impinge directly, in its prime condition, upon the heat-exchanger which forms the feed-water heater. I also reserve the right to heat other fluids in said heater. For example, air for combustion may be so heated. Figure 12 merely shows the upper half of said engine cut apart along line 12—12. The lower half is constructed similarly. The purpose of this illustration is to show a means for continuous bleeding of working fluid from the expansion chamber of a heat-engine. Side-plates 4 have bearing pads raised on their inward faces to effectually prevent or lessen steam leakage from the expansion chamber toward the shaft of said engine. These bearing pads are shaped to a contour which assures that the bleeding ports or port 6 have area contact between the rotor and said side-plates 4 on either side of said cored or otherwise formed passage or passages 6 to prevent steam leakage of any considerable moment of the bled steam and to insure that substantially all of said steam bled from the working or expansion chamber reaches the feed-water heater or the like. Shaft 7 is in driving connection with rotor 8 and located by bearings 9, which are retained by packing or stuffing box nut 10. Ring or housing 11 is located by and affixed to side-plates 4 by machined or otherwise accurately-formed bolts 12, secured by nuts 13, with stiffening, indexing spacers 14, which are tubular and enclose bolts 12 in part. They assure parallelism between the faces of ring 11 and prevent distortion and steam leakage when nuts 13 are tightened or screwed down on bolts 12.

Figure 12-A is a side elevation of the rotary engine shown in section in Figure 12, said section being taken along dotted line 12—12, looking downward on the upper half after it has been turned upside down. Figure 13 is an elevation of an engine constructed similarly to that shown in Figure 12-A save that both the outer ring defining the outer limits of the expansion chamber and the rotor defining the inner limits of said expansion chamber both rotate, so that instead of the end of vanes 3 rotating or rubbing for 360 degrees on the inner periphery of ring 11, they merely oscillate back and forth a short distance against said ring, altho there is no reciprocating unbalanced motion in so doing. Everything rotates on centres, consequently all parts, if made to weigh the same as their other identical parts, produce no objectionable vibrations and the engine runs as vibrationless as a well-balanced flywheel.

Figure 13 is a side elevation view of the same engine shown in section in Figure 13A with ring 33 and chamber 4a and its enclosing walls sectionalized and part of side-plate 4 cut away to expose ring 11 and vanes 109, and to show a few of the bucket-like slots in said ring 11. Figure 13A is a section taken along dotted line 13A—13A shown on Figure 13, but with only a part of the inner rotor 8 sectionalized to show the bearing or hub sockets enclosing shaft or hub 36, which is integral with hub or shaft 35. The outer rotor 4 and 11 is sectionalized, as also stationary enclosing ring 33 in which chamber 4a is formed thruout a part of its circular length. Steam enters thru nozzle 34, thru buckets 34, into chambers or pockets 22. Vanes 109 and 3 define the limits of said chambers or pockets in connection with rotor 8 and ring 11. The steam impinging and sweeping thru and against buckets 32 and the curved surfaces of the ring adjacent thereof aids in driving ring 11 forward, especially at high rotational speeds. After the ports formed between said ring 11 and buckets 32 pass beyond stationary nozzle 34 (stationary because formed in stationary ring 33) the steam is cut off from that coacting pocket and therefore said coating pocket receives no more steam until it completes its "stroke," exhausts the steam from it and returns again to a position where it again receives steam from nozzle 34. However, after said pocket has advanced to where the port or ports formed between ring 11 and bucket or buckets 32 mate with passage 6 in the inner part of ring 33 defining chamber 4a, a small amount of steam passes from pocket 22 thru said port 6 into chamber 4a wherein it impinges against coils 5 contained in chamber 4a. Said coils 5 contain feed-water or other substance to be heated and this substance or fluid circulates substantially in a counter-direction to the steam travelling from port 6 to the exhaust port 110. By the time pocket 22 has reached a position opposite or adjacent to this exhaust port it has forced all its steam thru port 6 or a continuation thereof into chamber 4a. Consequently, the coils 5 receive heat not only from bled steam but also from exhaust steam, thus substantially eliminating the necessity of a hot-well or the like. The fluid being heated is first heated with exhaust steam and then heated with bled steam, and port 6 is varied in width thruout its length so as to pass the proper quantity of bled steam during working and also offer free flow to the exhaust steam. By moving the ring 33 forward or backward along the circumference of ring 11 the amount of steam introduced to each pocket 22 per revolution can be varied. In other words: the cut-off is varied without wire-drawing, for the speed of closing of the inlet port is so rapid that wire-drawing is eliminated, yet it has the action of a slide-valve or piston valve but is much faster than any poppet valve, and many times faster than the best slide valves or piston valves or Corliss valves. There is also a combined turbine action and positive-displacement action, and the degree of each is automatically adjusted according to load and speed. The surprising high torque of the positive-displacement of this engine is difficult to understand but it is much like putting a pry bar under a car wheel on a railroad track. Rotor 8 rotates on hub or shaft 36 while rotor 4, 11 rotates on bearing 9 about shaft or hub 35. Power is not taken off either hub or shaft but is taken off ring 11, sideplates 4 or the bearing retaining projection of plate 4. A suitable gear, pulley or other power takeoff may be fastened to sideplate 4 or ring 11 or rotor 4, 11, or extensions thereof by means of bolts, studs, cap-screws, set-screws, or welding. Rotor 8 cannot rotate out of synchronism with rotor 4, 11, because if it attempted to do so the thrust of vanes 3, 109, against ring 11 prevents it. I have also invented positive locking means between the two rotors so they cannot move out of synchronism. Gear trains may also be provided between the two rotors, either inside or outside the housings, for this purpose. However, in general, the vanes 3, 109, and the ring 11 will assure synchronism of rotational motion. While it may be argued that the steam pushes as hard against ring 11 to rotate it in direction opposite to its push against rotor 8 and forward vane 3, 109, if the matter be diagrammed it will be found that the vector for the thrust against the ring 11 is not co-directional nor exactly opposite in direction from the vector depicting the locus of mean thrust against the ring 8 and the coating vanes. Because these vectors do not coincide nor strictly oppose each other but are offset, the engine rotates with a powerful thrust. As the engine rotates and the pockets enlarge in volume and the steam consequently lowers in pressure the divergence in direction between these vectors increases and the leverage consequently becomes greater. To some minds, an engine built according to the drawings and specification is inoperative but once the matter is analyzed by means of vector analysis or the like, it can be seen that it is operative. The vanes 3, 109, fit into sockets 19 which oscillate in parts 15 of the rotor 8 similarly to the engine shown in Figures 12, 12A, 12B, altho only the inner rotor rotates in this engine whereas both the rotor 8 and the enclosing housing 4, 11 rotate in the motor being described. The vanes or extensions thereof are fastened together at the centre on a riveted or otherwise formed hub much as is shown in the drawings cited. I also prefer to have the rotor 8 have a solid portion extend thruout the rotor to better brace it and the parts coacting with the vanes against centrifugal and torque stresses, much as is shown in Figure 12. The construction of the vanes, rotor, vane slots, and vane hub are similar in both engines. In fact, these parts function similarly in both engines. The vane hub is numbered 23 in Figure 12. Numerals 3a in this same figure illustrate the extensions of the vanes which hold them in fixed relation with said hub 23. As the motor rotates, the vanes oscillate in depressions or chambers 21 formed between parts 15 of rotor 8 as shown in Figure 12. Slides 19, which hold the vanes in fixed yet movable relation to rotor 8, also oscillate in cups or depressions or bearings formed in parts 15 which are attached to the hub extending thru rotor 8 or centrally located within rotor 8. This hub is numbered 8 in Figure 12. It and parts 15 may be one solid piece of metal, with chambers 21 and depressions coacting with parts 19 broached or otherwise fashioned or formed in said solid piece of metal. For example, a casting may be made to general shape and then broached to finished dimensions and surface smoothness. The fluid to be heated with bled and exhaust steam enters at 111 and exits at 112. The forces tending to rotate the inner rotor 8 within rotor 4, 11, are not very great since the area of the forward vane of a given pocket 22 is not greatly more than the area of the rearward vane of any given pocket 22, nor is the steam pressure difference on the opposing sides of any vane very great due to the gradual expansion or gradual volume differences of a preceding pocket compared with a succeeding pocket. If an engine be built according to the Figures 12, 12A, 13, 13A, it operates very smoothly and with enormous power compared with its size and weight. These figures give all information necessary to building the engine by one skilled in the art. The regenerative feature gives the engine very high thermal efficiency.

Bleeding port 6 commences at 29 and terminates at 31. Ring 11 and everything inside it depicted in Figure 12A could easily take the place of ring 11 and everything inside it depicted in Figures 13 and 13A. There is no essential difference in the two, save for the hub depressions in which hubs 36 fit. In fact, ring 11 and its assembly could be taken out of an engine built according to Figure 12 and 12A, hub depressions bored in its sideplates 8a and the assembly placed within ring 33 and the hubs 36 fitted into the coacting hub depressions and the latter engine operated. The two engines can be built so that ring 11 and its assembly which it encloses will fit within and operate in either engine.

In the engine in which both the ring and rotor rotate, the power is not derived solely from the forward push of the steam against the vanes, but a powerful "prybar" action takes place. The steam seeks to spread the ring away from the rotor but instead this powerful piston action is translated into driving the engine thru a powerful lever action. Four pistons are exerting a leverage pushing action at all times, the lower the pressure the greater the leverage. Constant torque is realized. The novel inlet ports provide an extremely efficient, yet simple, means for varying the expansion ratio, without any "wire-drawing" which is obtained with cut-off valves. Any desired expansion ratio up to 1,000 to one can readily be obtained, merely by moving the outer stationary ring.

Figure 12–A is shown with sideplate 8a of rotor 8 removed from the side in view, thus exposing the vanes 3 and supporting vane rods 3a, central ring or rotor 8, segments 15, segments 19, and ports 18. Dotted lines show bleeding ducts 2 and inlet ports 1. Rivet or bolts 23 form the centre of vane rods or connecting rods 3a, to which they are tied with rings or bearings 24. All vane rods 3a are of equal length, have a common centre about which they rotate. Ring 11 rotates about the same centre, thus insuring that the end of vanes 3 fit concentrically in said ring 11 and consequently the ends of vanes 3 fit flush at all times with coacting ring 11.

In the device shown in Figures 13 and 13–A the ends of the vanes rub against the inside of ring 11 for only 1/17.6 or approximately 6% as much per revolution as they do in the engine shown in Figure 12–A, and the sides of the vanes have correspondingly less relative travel, consequently this engine may be fitted tighter, or provided with tighter packing arrangements, such, for example, as that shown in Figures 6, 7, 8, 9, 10, 12, of my copending application Serial No. 503,454, filed by me September 22, 1943, now abandoned, and therefore it may be made positively steam tight and so remain indefinitely, since wear is so slight that leakage due to it would be trivial even after prolonged usage. With my novel packing devices, wear does not produce leakage but the longer the usage the better the fit. However, I have run engines for long periods without any packing strips or the like but with carefully machined and located coacting parts and have been unable to detect any appreciable steam leakage. The proper location of coacting parts, such as is provided by my construction and fabrication methods, is an important factor in the success of these engines, as is also the small pressure drop between vane pockets, for example pockets 22, so that steam pressure against the vanes does not cause them to bind or have excessive friction in their vane slots, for example the slots provided by the flat faces of opposite segments 19, or in the bearing surfaces between the round portions of segments 19 and their coacting seats.

If an infinite number of bleeding stages be had, ultra-high thermal efficiency may be attained in a steam engine, providing the latent and sensible heat of the abstracted steam is returned to the system, such as in the feed-water going to the boiler providing the steam for the engine. For example, if steam at 1800 p. s. i. and 1600° F. temperature be expanded adiabatically to 100 p. s. i. utilizing an infinite number of bleeding steps to take it down to 100° F. temperature, bleeding just sufficient steam to heat the feed-water, under pressure, to 648° F. temperature, a cycle efficiency of approximately 56% is obtained. By combining this cycle with my steam generator to obtain 98% or better overall thermal efficiency, my steam engine attains 97% or better mechanical efficiency and, estimating 3% of the power generated as used to drive the auxiliaries, we obtain an overall efficiency of $56\% \times 0.98 \times 0.97 - (0.03 \times .98 \times 0.97) = (51.5\%)$. This corresponds to the overall brake thermal efficiency, as obtained with fuel oil of 20,000 B. t. u. per pound, and based on a horsepower hour of 0.25 pound cheap fuel oil.

I have discovered that if I connect one of my steam generators directly to a steam engine, with intervening throttling, I obtain even higher efficiencies than as computed by the usual methods. This is due to the fact that as the feed pump drives the water toward the moving piston, the fire in the steam generator adds heat to produce expansion of this water at virtually 100% efficiency and the work produced on the piston by the difference in volume between the cold water and the hot steam times the pressure is obtained at virtually 100% conversion from heat units. As the steam expands it is compelled to do work. Since the steam at the end of this working has not diminished in heat content, the work done must come directly from heat absorption from the source of heat (the fire in this instance). In other words: heat travels from the fire thru the wall of the tube into the steam and does work against the piston, since the steam already has all the heat it can hold or is given all the heat it can hold at the same time work is being done. If sufficient heat is added to maintain the 1600° F. at 1800 p. s. i. pressure thruout this working, then the work done must come directly from the fire at 100% efficiency.

Since it is possible to attain T1—T2/T1 efficiency if full advantage is taken of my regenerative cycle, I have, by using this constant-pressure, constant-temperature working in addition, achieved a higher thermal efficiency than the limitations set by the so-called ideal Carnot cycle, and the bars are down and no longer is humanity inhibited by this falsely-imagined limit.

Feed pump 1 pumps working fluid into coils 2 of steam-generator 3, then from said coils the steam goes directly to working chamber 4 and does work in driving piston 5. This steam is then expanded in pockets or cylinders 6. The volume of the fluid increases considerably from pump 1 to working chamber 4 and during such expansion it is receiving heat and doing work against piston 5.

On expanding from 1600° F. to 100° F., the rotor and vanes will have a temperature lower than an arithmetic mean of 850° F. The sideplates will tend to overheat in the region near the inlet nozzle, altho conduction from here to the colder parts of said sideplate may be sufficiently rapid to keep said zone sufficiently cool. However, cooling jackets may be provided in or on said sideplates for the circulation of cooling media therethrough. One means is to circulate said cooling fluid from the hot region to the cooler region of said plates, cooling at one place and discharging heat at another place and hence making a self-contained unit and cycle. If extremely hot steam or gases are used, some external cooler may be desirable in the circuit or cycle.

The extremely high temperature steam has so much greater volume that for a given ratio of expansion it will produce a lower terminal temperature. In Figure 13, feed-water heater 5 has been shown only in part. It fills the annular chamber between the points where drawn, so that from the time of commencement of bleeding to the end of the exhaust stroke, steam passes from the pockets of the engine to the heater chamber thru a narrow slit 6 corresponding to slit 6 in Figures 12 and 12–A. From point point 29 to about point 30, steam is bled from working fluid whereas from about point 30 to point 31, exhaust steam passes thru said slit. From point 29 to point 30, the width of the slit is calibrated to pass just the correct amount of steam to heat the feed-water and may vary in width, altho in general a constant, width slit gives good results. From point 30 to point 31, this slit is the full width of the inlet passages or buckets 32, so that exhaust steam may readily be passed outward into chamber or heater 5 and from it to the hot-well or feed-pump or condenser. While these inlet ports or buckets are shown with limited length in the direction of their rotation, they may be provided in a larger number in series or of any length up to the limit of the pocket they are provided for. With a limited number, a variation in expansion ratio may be obtained by moving ring 33, so that inlet nozzle 34 is varied during the time it is connected with said inlet passages 32, or, rather, is varied in relation to the size of the inlet pocket 22 during said connection, so that a variation in amount of steam passed to the expansion pockets is effected.

While I have shown only eight vanes in Figures 12–A and 13, I prefer to have sixteen or more vanes, especially in my arrangement whereby I have larger diameter and lesser width for a given horsepower, which has the advantage of more easily providing for a larger number of expansions, and hence less stress and binding torque on a given vane and its coacting seats and/or joints, and provides higher speed to the vanes or higher speed of steam working, with lessened centrifugal stresses.

It may be argued that the feed-water heater of supposedly small extent in chambers 4a are not sufficient to absorb the heat of the abstracted steam plus the heat absorbed between cold feed-liquid, if such be fed, and the lower or terminal temperature of the abstracted steam. However, a heater on an engine of the size shown, if built no larger than the actual size of the drawings, can hold six or more feet of tubing having a heat-absorbing area of five or more square feet, and this is more than ample to absorb the proper amount of heat, providing it is built of high conductivity metal and arranged so that high turbulence is obtained in the fluid streams involved and especially if a countercurrent is had between the two streams (liquid and vapor).

Figure 12–B illustrates an improved vane holder in which 19a and 40a are one part with 19. Arms 40a slide in and out of recesses 40 as the vane moves to conform to the eccentricity between the ring and rotor. The arms 40a provide more support aginst centrifugal force and the parts 40a and 19a provide greatly enlarged bearing area for vanes 3.

Figure 13–A is a section taken along line 13A—13A showing the eccentric relation between shafts 35 and 36. Shaft 36 fits into a bearing depression in rotor 8 and since shaft 36 and shaft 35 are integral and stationary, they hold the revolving rotor and ring in fixed spaced relation with each other. A further connector (not shown) connects rotor 8 and sideplate 4 and prevents rotor 8 from turning when ring 11 does not turn. This connector has oppositely turned round projections at either end. One of these round projections fits into a hole in the sideplate 4 while the other round projection fits into a hole and bearing in rotor 8. The revolution of this connector takes place in a depression in sideplate 4. Strap 40b holds 19a and 40a to vane 3.

In my multiple vane rotary motors, it is important to have a sufficient number of vanes so that the differential pressure on either side of a given vane is not large, otherwise the vane will stick or bind, especially in types of engines having a swing joint near the periphery of the rotor thru which the vane slides. The number of vanes necessary to prevent this sticking or binding or excessive friction will also depend a great deal on the initial steam pressure. In general, the higher the initial steam pressure, the more vanes will be required.

In general, I prefer to have sixteen or more vanes in a steam engine wherein there is no compounding from one engine to another. I prefer to expand the steam in one engine, not only for simplicity but that the engine may be kept cool, since the temperature of most of the parts exposed to steam will be some mean between initial and exhaust steam temperature. This makes it possible to use extremely hot steam. Inasmuch as the vanes, rotor, ring and sideplates contact relatively cool steam for longer intervals, in each revolution, than hot steam, the mean temperature will tend to be lower than a true mean and will be more of an average determined by multiplying temperature at each zone or sector by the time interval for that zone or sector and then dividing the total temperatures by the number of equal zones or sectors. The exhaust steam will have longer time to cool the parts than the hot steam will have to heat it.

I have designed engines with from eight to two hundred vanes per rotor, and have built quite a range of engines and prefer a relatively small vane rise and a large number of vanes. The larger the number of vanes the smaller the vane rise that can be used for a given horsepower and expansion ratio. I have used steam up to 1800° F. temperature, and up to several thousand pounds per square inch pressure.

When using hot steam and high pressures and my regenerative system, a horsepower-hour can be obtained on ¼ pound or less fuel oil.

A multiplicity of vanes also absorb considerable horsepower as kinetic energy in addition to that developed from positive displacement.

I claim:

1. In a rotary motor, a rotor, a stator, a plurality of relatively small passages through said stator opening against the side of said rotor, and a duct from the periphery of said rotor to the side thereof and so disposed as to register in turn with the said passages through the said stator.

2. A steam engine, comprising a movable inner member and an outer member defining an expansion chamber, a duct thru said movable inner member one end of which cooperates with ducts thru said outer member, a large number of ducts thru said outer member disposed to register with that end of the duct thru the inner member which opens on its side face, the number of said ducts being such that they provide, in effect, uninterrupted continuous bleeding.

3. A rotary motor, comprising a rotor, a stator in which said rotor is mounted, a duct from the periphery of said rotor to a lateral face thereof, and a large number of ducts of relatively small cross section through said stator disposed to register with that end of the duct through the rotor which opens on the said side face, the said ducts acting to bleed steam from the interior of the mechanism consecutively and not concurrently.

4. In a rotary motor, a rotor, a stator, a chamber therebetween for receiving fluid under pressure, inlet and outlet openings in said stator for admitting fluid to and from said chamber, vanes carried by said rotor, said vanes being radially slidable and adapted to engage the inner wall of said stator during rotation of the rotor to partition said chamber between said inlet and said outlet, a plurality of relatively small passages through said stator opening against the side of said rotor, and a duct from the periphery of said rotor to the side thereof and so disposed as to register in turn with said passages through said stator.

5. In a rotary motor, a rotor, a stator, a chamber therebetween for receiving fluid under pressure, inlet and outlet openings in said stator for admitting fluid to and from said chamber, vanes carried by said rotor, said vanes being radially slidable and adapted to engage the inner wall of said stator during rotation of the rotor to partition said chamber between said inlet and said outlet, a plurality of relatively small passages through said stator opening against the side of said rotor, a duct from the periphery of said rotor to the side thereof and so disposed as to register in turn with said passages through said stator, valve means in said duct for controlling the passage of fluid therethrough, and means comprising a rotatable cam for actuating said valve.

6. A rotary motor comprising a rotor, a stator in which said rotor is mounted, said stator being mounted eccentric to said rotor, said rotor and stator defining a working chamber therebetween, inlet and outlet opening in said stator for admitting fluid under pressure to and from said working chamber, vanes carried by said rotor, said vanes being radially slidable and adapted to engage the inner wall of said stator during rotation of the rotor to partition said chamber between said inlet and said outlet, a plurality of relatively small passages through said stator opening against the side of said rotor, and a duct from the periphery of said rotor to the side thereof and so disposed as to register in turn with said passage through said stator.

7. A rotary engine adapted to generate power from compressed fluids, said engine comprising a rotor, a stator in which said rotor is mounted, said stator being mounted eccentric to said rotor, said rotor and stator defining a working chamber therebetween, inlet and outlet openings in said stator for admitting fluid under pressure to and from said working chamber, vanes carried by said rotor, said vanes being radially slidable and adapted to engage the inner wall of said stator during rotation of the rotor to partition said chamber between said inlet and said outlet, a plurality of relatively small passages through said stator opening against the side of said rotor, and a duct from the periphery of said rotor to the side thereof and so disposed as to register in turn with said passages through said stator, a valve in said duct for controlling the passage of fluid, and a rotary cam means for actuating said valve.

8. A steam engine comprising a rotor, a stator, a chamber therebetween for receiving steam under pressure, inlet and outlet openings in said stator for admitting said steam to and from said chamber, vanes carried by said rotor, said vanes being radially slidable and adapted to engage the inner wall of said stator during rotation of the rotor and to partition said chamber between said inlet and said outlet openings, a plurality of relatively small passages through said stator opening against the side of said rotor, and a duct from the periphery of said rotor to the side thereof and so disposed as to register in turn with said passages through said stator.

9. A steam engine comprising a rotor, a stator, said rotor being mounted for rotation within said stator, said rotor and stator being mounted eccentrically and defining a fluid working chamber therebetween, inlet and outlet openings through the stator for admitting steam to the chamber, means comprising a plurality of passages through said stator for bleeding steam from said chamber progressively as said rotor rotates about said stator, and a duct from the periphery of said rotor to the side thereof and so disposed as to register in turn with said passages through said stator.

10. A steam engine comprising a rotor, a stator, a chamber therebetween for receiving steam under pressure, inlet and outlet openings in said stator for admitting said steam to and from said chamber, vanes carried by said rotor, said vanes being radially slidable and adapted to engage the inner walls of said stator during rotation of the rotor and to partition said chamber between said inlet and said outlet openings, a plurality of relatively small passages through said stator opening against the side of said rotor, fluid passageway means extending through said rotor and registerable with said passages in the stator, said passages being spaced circumferentially about said stator and the number of passages being sufficient to provide uninterrupted substantially continuous bleeding of steam pressure through said stator.

11. A steam engine comprising a rotor, a stator, a chamber therebetween for receiving fluid under pressure, inlet and outlet openings in said stator for admitting fluid to and from said chamber, vanes carried by said rotor, said vanes being radially slidable and adapted to engage the inner wall of said stator during rotation of the rotor and to partition said chamber between said inlet and said outlet openings, means to move said vanes, an adjustable sleeve valve mechanism in said rotor, means to adjust said mechanism, a plurality of ducts extending from the inner periphery of said rotor to the outer periphery thereof and registerable with the openings in said sleeve valve part, and passages through said stator for bleeding of fluid under pressure therethrough and disposed so as to register with passages through said rotor.

References Cited in the file of this patent

UNITED STATES PATENTS

| | | |
|---|---|---|
| 332,670 | Marchant | Dec. 15, 1885 |
| 369,922 | Creuzbaur | Sept. 13, 1887 |
| 563,814 | Steinhoenig | July 14, 1896 |
| 938,309 | DeFerranti | Oct. 26, 1909 |
| 963,207 | Burleigh | July 5, 1910 |
| 968,262 | Procner | Aug. 23, 1910 |
| 1,238,870 | Augustine | Sept. 4, 1917 |
| 1,261,104 | Cothran | Apr. 2, 1918 |
| 1,320,531 | Carroll | Nov. 4, 1919 |
| 1,653,560 | Gleichmann | Dec. 20, 1927 |
| 1,686,245 | Mueller | Oct. 2, 1928 |
| 1,766,678 | Noack | June 24, 1930 |
| 1,781,368 | Davidson | Nov. 11, 1930 |
| 1,790,154 | Kasley | Jan. 27, 1931 |
| 1,846,047 | Brown | Feb. 23, 1932 |
| 1,982,060 | McCallum et al. | Nov. 27, 1934 |

FOREIGN PATENTS

| | | |
|---|---|---|
| 225,576 | Great Britain | July 8, 1926 |